Aug. 27, 1929.　　　　C. SLICE　　　　1,725,939
ATTACHMENT FOR COMBINED REAPER THRASHERS
Filed May 22, 1926　　2 Sheets-Sheet 1
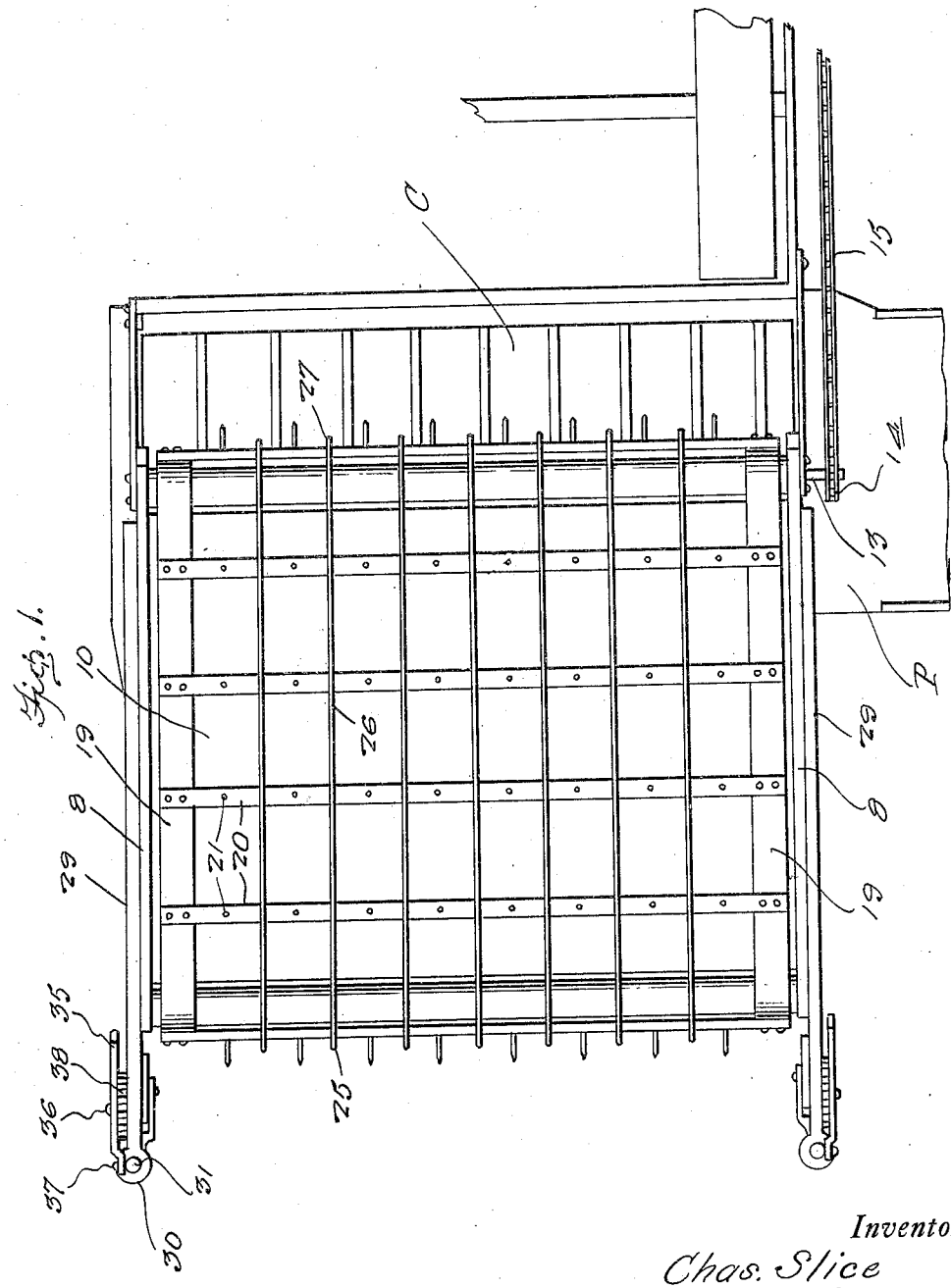
Inventor
Chas. Slice
By Clarence A. O'Brien
Attorney Aug. 27, 1929.  C. SLICE  1,725,939
ATTACHMENT FOR COMBINED REAPER THRASHERS
Filed May 22, 1926   2 Sheets-Sheet 2
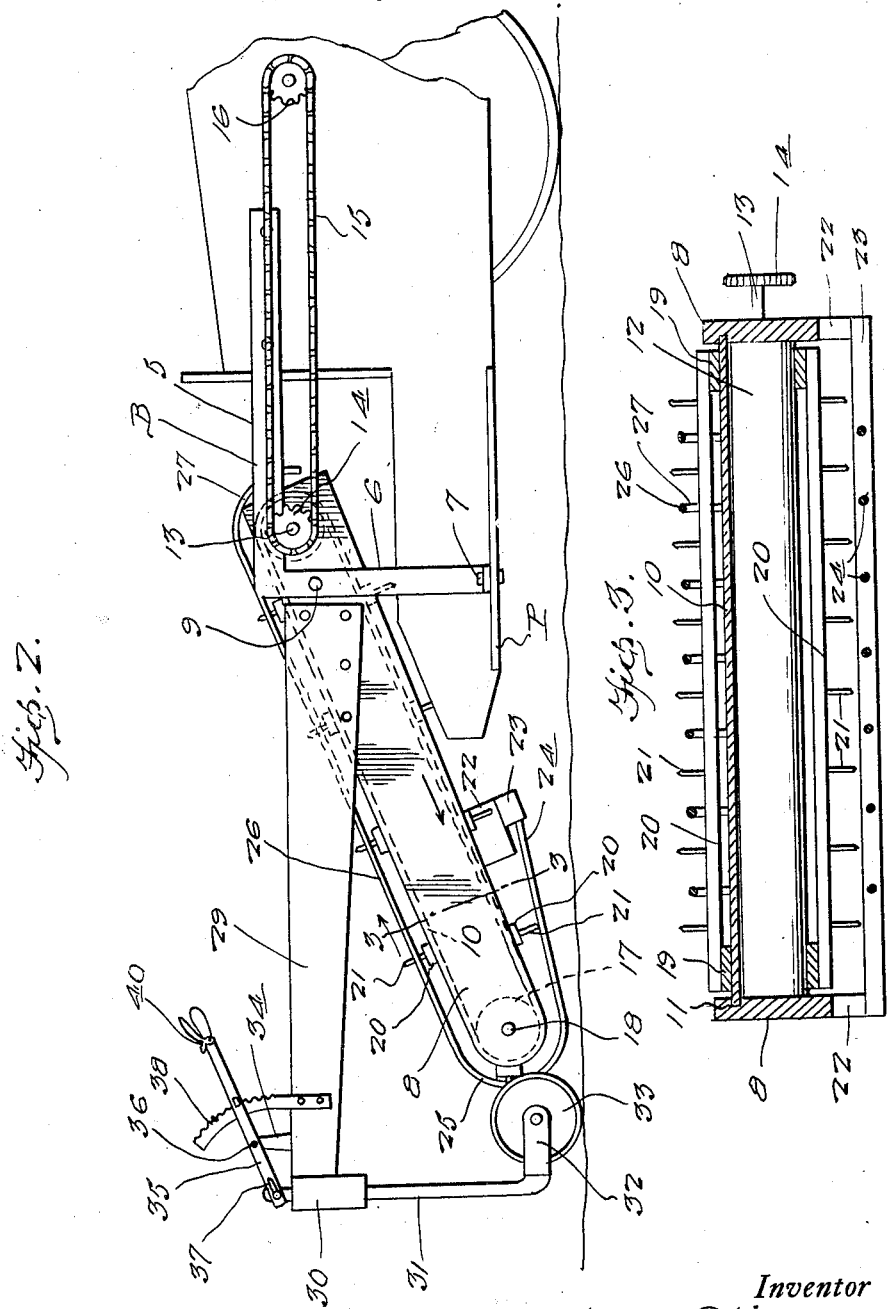
Inventor
Chas. Slice
By Clarence A O'Brien
Attorney Patented Aug. 27, 1929.

1,725,939

UNITED STATES PATENT OFFICE.

CHARLES SLICE, OF STERLING, COLORADO.

ATTACHMENT FOR COMBINED REAPER THRASHERS.

Application filed May 22, 1926. Serial No. 111,042.

The present invention relates to an attachment for a standing grain thrasher otherwise known as a reaper-thrasher or combine, which latter name it will hereafter be referred to, for the purpose of picking up, elevating and delivering to the platform of the combine any grown crop that has been by other methods loosened from the ground.

The usefulness of this machine lies in its ability to save labor and shattering or shelling caused from the handling of the crop in the above described loose condition, when heretofore methods of handling are employed.

This invention is particularly valuable in the handling of pinto or any other variety of bean crop where it is necessary to loosen such crop from the ground before the process of handling or thrashing is begun.

Another very important object of the invention lies in the provision of an attachment of this nature which is exceedingly simple in its construction, efficient and reliable in operation, easy to handle, adjustable, strong, durable, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a top plan view of my attachment showing also the platform of a combine with the guards and reel removed, Fig. 2 is a side elevation thereof, and Fig. 3 is a detail transverse section taken substantially on the line 3—3 of Fig. 2, looking in the direction of the arrow.

Referring to the drawing in detail, it will be seen that I have shown in a fragmentary manner, a portion of a well known type of combine wherein the platform P is provided with a transverse conveyor C. These portions of the combine are well known in the art and need no further illustration or description and, of course, have merely been disclosed by way of example to illustrate the operation of the present attachment about to be described in detail.

A pair of brackets B are mounted on the combine and are substantially L-shaped in formation including an upper horizontal arm 5 projecting forwardly over the platform from a portion of the combine and merging into the depending vertical arm 6, the lower extremity of which is attached to the platform P in any suitable or preferred manner, as is indicated at 7. These two brackets B support the attachment on the combine.

Referring now in detail to the attachment per se, it will be seen that the numerals 8 denote two side boards which incline downwardly and forwardly from the tops of the vertical arms 6 of the brackets B, and are attached thereto in any preferred manner as is indicated at 9. A platform 10 has its longitudinal edges received in longitudinal grooves 11 provided in the inner faces of the side boards 8 so as to incline downwardly and forwardly from the combine over the forward portion of the platform P. A roller 12 is mounted on a shaft 13 journaled in the upper ends of the side boards 8 and having on one end thereof a sprocket 14 over which is trained a chain 15 operable by and trained over a sprocket 16 forming part of the combine.

A roller 17 is mounted on a shaft 18 journaled between the lower ends of the side boards 8. Both of these rollers 12 and 17 are located in the platform 10. A pair of belts 19 are trained over the two rollers 12 and 17 and over the platform 10 at the longitudinal side edges thereof and are connected by a plurality of spaced parallel transverse slats 20 having each a plurality of spaced prongs 21 projecting therefrom. These belts 19 and slats 20 form an endless conveyor.

Extensions 22 are disposed on intermediate portions of the under edges of the side boards 8 and support a transversely extending bar 23. A plurality of tines 24 are fixed to the bar 23 and project forwardly therefrom, and merge into curved portions 25 concentric about the axis of the shaft 18, said curved portion 25 merging into upwardly and rearwardly inclined straight portions 26 which terminate in curved extremities 27 concentric about the axis of shaft 13. The straight portions 26 are disposed above and in parallelism with the platform 10, and the prongs 21 move therebetween, while the slats 20 move thereunder.

A pair of beams 29 are fixed to the side boards 8 and project forwardly at acute angles thereto so as to be disposed substantially horizontal. The forward ends of these beams 29 terminate in sleeves 30 positioned substantially vertical for slidably receiving shanks 31, the lower ends of which merge into horizontal yokes 32 in which are journaled wheels 33. Brackets 34 rise from the beams 29 adjacent sleeve 30 and have pivoted thereon, intermediate portions of levers 35 as is indicated at 36. These levers 35 have pin and slot connections 37 with the upper ends of the shanks 31.

Toothed quadrons 38 rise from the beams 29 for association with the usual catch structures 40 on the levers 35, whereby these levers may be swung to and held in different adjusted positions. The swinging of these levers obviously move the sleeves 30 up and down on the shanks 31, thereby raising and lowering the lower ends of the side boards 8 in respect to the ground, thus providing the necessary adjustment for practical operation.

With this attachment, it will be seen that grown crops that have become loosened upon the ground, may be picked up and delivered to the combine in an efficient and reliable manner. As the combine moves along, the endless conveyor structure will be operated in its orbit, so that the prongs 21 on the slats 20 engage the crops on the ground and move them upwardly along the straight inclined portion 26 of the tines 24, and along the downwardly curved extremities 27 so as to fall on the transverse endless conveyors C, which is a part of the combine. It will of course be apparent that this attachment is used after the combine has gone over the field to gather the standing crops. The attachment is readily adjustable depending upon the nature of the crop and the ground over which the combine passes.

It is thought that the construction, operation and advantages of this attachment, will now be clearly understood by those skilled in the art of combines, without a more detailed description thereof. The present embodiment of the invention has been disclosed in detail merely by way of example, since in actual practice it attains the features of advantage enumerated as desirable in the statement of the invention and the above description. It will be apparent that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

1. An attachment for a combine; wherein the combine includes among other elements, a platform with a transverse conveyor associated therewith; comprising a pair of brackets mounted on the combine, a pair of side boards pivotally engaged with the brackets and inclined forwardly and downwardly therefrom, a platform engaged with the side boards adjacent their upper edges, a pair of rollers one at each end of the pair of side boards, a pair of endless belts trained over the rollers, one adjacent each end thereof, a plurality of spaced parallel transverse slats on the belts, prongs extending from the slats, means for rotating one of the rollers, extensions formed on intermediate portions of the lower edges of the side boards, a bar fixed to said extensions, a plurality of tines projecting from the bar forwardly and merging into curved portions concentric about the axis of the lower roller, said curved portions merging into upwardly inclined straight portions disposed above the platform of the attachment, and terminating into downwardly curved portions concentric about the upper rollers.

2. An attachment for a combine; wherein the combine includes among other elements, a platform with a transverse conveyor associated therewith; comprising a pair of brackets mounted on the combine, a pair of side boards, pivotally engaged with the brackets and inclined forwardly and downwardly therefrom, a platform engaged with the side boards adjacent their upper edges, a pair of rollers one at each end of the pair of side boards, a pair of endless belts trained over the rollers, one adjacent each end thereof, a plurality of spaced parallel transverse slats on the belts, prongs extending from the slats, means for rotating one of the rollers, extensions formed on intermediate portions of the lower edges of the side boards, a bar fixed to said extensions, a plurality of tines projecting from the bar forwardly and merging into curved portions concentric about the axis of the lower roller, said curved portions merging into upwardly inclined straight portions disposed above the platform of the attachment and terminating into downwardly curved portions concentric about the upper roller, means for raising and lowering the lower end of the side boards.

3. An attachment for a combine; wherein the combine includes among other elements, a platform with a transverse conveyor associated therewith; comprising a pair of brackets mounted on the combine, a pair of side boards pivotally engaged with the brackets and inclined forwardly and downwardly therefrom, a platform engaged with the side boards adjacent their upper edges, a pair of rollers one at each end of the pair of side boards, a pair of endless belts trained over the rollers, one adjacent each end thereof, a plurality of spaced parallel transverse slats on the belts, prongs extending from the slats, means for rotating one of the rollers, extensions formed on intermediate portions of the lower edges of the side boards, a bar fixed to said extensions, a plurality of tines projecting from the bar forwardly and merging into curved portions concentric about the axis of the lower roller, said curved portions merging into upwardly inclined straight portions disposed above the platform of the attachment, and terminating into downwardly curved portions concentric about the upper roller, a pair of beams, one attached to each side board and extending forwardly at an acute angle thereto, and means associated with the forward ends of the beams for raising and lowering them in relation to the ground.

4. An attachment for a combine; wherein the combine includes among other elements, a platform with a transverse conveyor associated therewith; comprising a pair of brackets mounted on the combine, a pair of side boards pivotally engaged with the brackets and inclined forwardly and downwardly therefrom, a platform engaged with the side boards adjacent their upper edges, a pair of rollers one at each end of the pair of side boards, a pair of endless belts trained over the rollers, one adjacent each end thereof, a plurality of spaced parallel transverse slats on the belts, prongs extending from the slats, means for rotating one of the rollers, extensions formed on intermediate portions of the lower edges of the side boards, a bar fixed to said extensions, a plurality of tines projecting from the bar forwardly and merging into curved portions concentric about the axis of the lower roller, said curved portions merging into upwardly inclined straight portions disposed above the platform of the attachment and terminating into downwardly curved portions concentric about the upper roller, a pair of beams, one attached to each side board and extending forwardly at an acute angle thereto, the forward ends of said beams terminating in sleeves vertically disposed, shanks slidable through said sleeves, rollers journaled on the lower ends of said shanks, and means for moving the shanks thru the sleeves and holding them in adjusted positions.

5. An attachment for a combine; wherein the combine includes among other elements, a platform with a transverse conveyor associated therewith; comprising a pair of brackets mounted on the combine, a pair of side boards pivotally engaged with the brackets and inclined forwardly and downwardly therefrom, a platform engaged with the side boards adjacent their upper edges, a pair of rollers, one at each end of the pair of side boards, a pair of endless belts trained over the rollers, one adjacent each end thereof, a plurality of spaced parallel transverse slats on the belts, prongs extending from the slats, means for rotating one of the rollers, extensions formed on intermediate portions of the lower edges of the side boards, a bar fixed to said extensions, a plurality of tines projecting from the bar forwardly and merging into curved portions concentric about the axis of the lower roller, said curved portions merging into upwardly inclined straight portions disposed above the platform of the attachment and terminating into downwardly curved portions concentric about the upper roller, a pair of beams, one attached to each side board and extending forwardly at an acute angle thereto, the forward ends of said beams terminating in sleeves vertically disposed, shanks slidable through said sleeves, rollers journaled on the lower ends of said shanks, standards rising from the beams, levers having intermediate portions to the standards, pin and slot connections between the levers and the standards.

6. An attachment for a combine; wherein the combine includes among other elements, a platform with a transverse conveyor associated therewith; comprising a pair of brackets mounted on the combine, a pair of side boards pivotally engaged with the brackets and inclined forwardly and downwardly therefrom, a platform engaged with the side boards adjacent their upper edges, a pair of rollers, one at each end of the pair of side boards, a pair of endless belts trained over the rollers, one adjacent each end thereof, a plurality of spaced parallel transverse slats on the belts, prongs extending from the slats, means for rotating one of the rollers, extensions formed on intermediate portions of the lower edges of the side boards, a bar fixed to said extensions, a plurality of tines projecting from the bar forwardly and merging into curved portions concentric about the axis of the lower roller, said curved portions merging into upwardly inclined straight portions disposed above the platform of the attachment and terminating into downwardly curved portions concentric about the upper roller, a pair of beams, one attached to each side board and extending forwardly at an acute angle thereto, the forward ends of said beams terminating in sleeves vertically disposed, shanks slidable through said sleeves, rollers journaled on the lower ends of said shanks, standards rising from the beams, levers having intermediate portions to the standards, pin and slot connections between the levers and the standards, and means for holding said levers in different adjusted positions in relation to the beams.

In testimony whereof I affix my signature.

CHARLES SLICE.